United States Patent
Kuhstoss et al.

(10) Patent No.: US 7,306,753 B2
(45) Date of Patent: Dec. 11, 2007

(54) METHOD OF MAKING A THIN POROUS LAYER

(75) Inventors: Andreas Kuhstoss, Remscheid (DE); Thomas Röthig, Schwelm (DE); Peter Neumann, Remscheid (DE)

(73) Assignee: GKN Sinter Metals GmbH (DE)

( * ) Notice: Subject to any disclaimer, the term of this patent is extended or adjusted under 35 U.S.C. 154(b) by 554 days.

(21) Appl. No.: 10/803,209

(22) Filed: Mar. 18, 2004

(65) Prior Publication Data

US 2004/0201119 A1 Oct. 14, 2004

Related U.S. Application Data

(60) Division of application No. 10/186,601, filed on Jul. 1, 2002, now abandoned, which is a continuation of application No. PCT/EP00/09422, filed on Sep. 27, 2000.

(51) Int. Cl.
*C04B 33/34* (2006.01)
(52) U.S. Cl. ............... 264/43; 264/44; 419/2
(58) Field of Classification Search ............ 264/43–44; 419/2, 7, 9
See application file for complete search history.

(56) References Cited

U.S. PATENT DOCUMENTS 5,592,686 A 1/1997 Third et al. ............... 419/2
5,824,220 A 10/1998 Grangeon et al. .......... 210/490
6,652,804 B1 * 11/2003 Neumann et al. .............. 419/2

FOREIGN PATENT DOCUMENTS

| DE | 197 58 454 A1 | 10/1998 |
|---|---|---|
| DE | 197 26 961 C1 | 11/1998 |
| EP | 0 525 325 B1 | 2/1993 |
| EP | 0 864 389 | 9/1998 |
| EP | 0 977 909 B1 | 2/2000 |
| GB | 2 025 835 A | 1/1980 |
| JP | 61-023706 | 2/1986 |
| JP | 62-120403 | 1/1987 |
| JP | 03-226534 | 10/1991 |
| JP | 07-145405 | 6/1995 |
| JP | 04-248269 | 3/2002 |
| WO | WO 98/48077 * | 10/1998 |
| WO | WO 99/54524 | 10/1999 |

* cited by examiner

*Primary Examiner*—Carlos Lopez
(74) *Attorney, Agent, or Firm*—Woodcock Washburn

(57) ABSTRACT

The aim of the invention is to produce a thin porous layer, with a defined porosity and also, a high strength. Said aim is achieved, whereby such a layer with open porosity is produced from a mixture, comprising a sinterable powder with a predetermined powder particle size distribution. The sintered layer is of a thickness, which corresponds to about triple the average diameter of the powder particles employed, has a pore diameter in the range from 0.01 to 50 μm and a tensile strength of in a range from about 5 to 500 $N/mm^2$. The invention further relates to a method for the production of said thin porous layer with open porosity.

15 Claims, No Drawings

METHOD OF MAKING A THIN POROUS LAYER

RELATED APPLICATIONS

This is a Divisional of U.S. application Ser. No. 10/186,601 filed Jul. 1, 2002, now abandoned, which is a continuation of International Application No. PCT/EP00/09422 filed Sep. 27, 2000, which claims priority to German Application No. 199 63 698.2 filed Dec. 29, 1999.

BRIEF DESCRIPTION OF THE INVENTION

The invention concerns a thin porous layer with open porosity, manufactured from a mixture containing sinterable powder, and also a procedure for its production.

Porous bodies are required for the most varied applications in technology. These bodies flow through a flowing medium whereby either reactive processes take place or the solid particles contained in the flowing medium are retained or filtered. Filter pads made from ceramic material must generally be relatively thick to prevent breakage. The low strength and low resistance to temperature limit the use of plastics as filter material. Metallic material is used as a porous layer in the form of tissues or fabrics manufactured from metallic fibers. Filter pads made from pressed and sintered metallic powders are also relatively thick due to technical reasons. These filter pads must be manufactured relatively thick mainly because they do not exhibit the required strength, particularly the tensile and shearing strength. Since the thickness does not reduce (particularly in case of extremely fine porous material), the flow resistances increase.

Irrespective of the material used, the unwanted flow resistances in case of a porous layer flowing through from a medium must be reduced by making the layer as thin as possible and the layers given adequate strength. Thin layers, for example with thickness of about 100 μm can be produced from metallic tissues or fabrics.

However, these are less strong, have relatively larger pores and high porosity tolerances. The manufacture of such type of tissues and fabrics requires correspondingly thin and also expensive threads. Hence, the tissues and fabrics manufactured from these are also expensive.

EP 0 525 325 B1 puts forth a procedure for manufacturing porous, metallic sintered workpieces, whereby a metallic powder is suspended in a carrier fluid containing a binding agent dissolved in a solvent and the fluid adjusted such that the suspension can be poured. This suspension is poured into a mould. The solvent is then evaporated so that the remaining binding agent strengthens the metallic powder in the shape given by the mould and forms a commercially viable green body. After removing from the mould, the green body is sintered in the usual way. This known procedure is preferred for manufacturing relatively thick-walled sintered parts, which, owing to their geometry, can be better manufactured with the pouring process than the traditional method, in which metallic powder is pressed in a mould. Thin-layered, open porous parts cannot be manufactured with this procedure. The thin layers manufactured by this procedure are brittle; they do not exhibit adequate strengths.

The invention has the task of producing a thin porous layer with a defined porosity and sufficient strength and devising a procedure for its manufacture.

The solution is a thin porous layer with open porosity manufactured from a mixture of sinterable powder with a predetermined powder particle size distribution. The sintered layer exhibits a thickness, which corresponds to about triple the average diameter of the powder particles used.

Moreover, the thickness mainly lies within a range of about 3 times to 25 times, preferably 3 times to 10 times the diameter of the powder particles, has a defined pore diameter in the range of about 0.01 to 50 μm and a tensile strength in the range of about 5 to 500 N/mm$^2$, preferably 20 to 400 N/mm$^2$, and more preferably 50 to 300 N/mm$^2$, measured in accordance with DIN EN 10002.

Sinterable powders, according to the invention, refer to powders manufactured from metals, metallic oxides, ceramics and/or plastics. Usable metallic powders according to this invention are not only powders made from pure metals, but also those made from metallic alloys and/or powder mixtures of different metals and metallic alloys. These metals are particularly steels, preferably chromium-nickel-steels, bronzes, nickel-based alloys such as Hastalloy, Inconel or the like. Powder mixtures can also contain high melting components like platinum or the likes. The used metallic powder and its particle size depend on the purpose of use. Preferred powders are the alloys 316 L, 304 L, Inconel 600, Inconel 625, Monel and Hastalloy B, X and C.

The abovementioned ratio of layer thickness to particle diameter ensures that many layers of particles are arranged one on top of the other and holes larger than the desired pore diameter are avoided, thereby also avoiding through holes. The grain size and therefore the diameter of the used powder particles lie in a range of 0.05 μm to 150 μm, preferably, in a range of about 0.5 μm to 100 μm, more preferably in a range of 0.5 μm to 6 μm.

Non-homogeneity and hollow spaces in the thin porous layer are thus positively avoided. It is also possible to influence the porosity range up to a certain degree through the particle size of the used sinterable powder.

The maximum thickness of the invented layer is about 500 μm; it preferably lies in a range of about 5 to 300 μm, more preferably 5 to 18 μm. Such types of thin layers with sufficient strength were not manufactured so far. The invented layer shows remarkably low flow resistance while passing through with fluid or gaseous media and also a sufficiently high strength and stiffness. Thus, the invented layer can be used without a carrier body as films or membrane or can be bound firmly with a carrier body. The invented layer also adjusts excellently to an uneven, for example bent surface on account of its retained flexibility.

Another preferred type is the thin porous self-supporting layer. Self-supporting in the sense of this invention means that the invented layer can be used without any carrier body and yet does not become fragile or brittle. Thus, it is possible to manufacture film sheets and place them one on top of the other in many layers and if necessary, cut them as per the requirements. Because of their self-supporting properties, the invented layers can be used as filters and catalyst materials wherever, for example, materials similar to paper were used so far. The invented thin porous layers made from sinterable powders are superior to the familiar paper films or films made from paper-like material because of their distinctly higher service lives, better backwashing properties and a broader area of application, particularly in view of the possible temperatures and pH-values.

The bubble-point pressure of the invented layer lies preferably in a range of about $8 \times 10^6$ to $2 \times 10^3$ Pa, especially preferred in a range of about $8.6 \times 10^6$ to $1.72 \times 10^2$ Pa, determined according to DIN 30911.

In another invented design, the mixture (from which the thin porous layer is manufactured) is made up of inorganic and/or organic pore forming materials. Urea is especially suitable for this purpose. It exists in the crystalline form and therefore in defined particle sizes. Anyway, it is also possible to use ammonium carbonate and other inorganic salts. Styropor, sucrose, gelatins and tapestry glues are the organic pore forming materials used. However, the usual binding agents or paraffin, which are used as auxiliary materials for reducing the friction in the tools used in powder metallurgy, can also be used. These binding agents and paraffin are not used in the usual low concentrations but are used in a portion of at least about 5 vol.-%, preferably more than 12 vol.-% in the mixture for manufacturing the thin porous layer. The pore forming materials can exist in the defined particle form and particle size and also as a solution and soluble dissolved in a solvent to be used. The pore forming materials generally exist in defined particle form and size.

The pore forming materials can be divided into two different groups, firstly a group of pore forming materials that serve as retainers for the mixture to be sintered for the fine pores formed later. The other group consists of pore-forming materials that are used as fillers usually to achieve high porosity. In the first mentioned group, in which the pore forming materials function as retainers, the same are used in a particle size (grain size) that lies in the size range that must exhibit the fine pores contained in the thin porous layer.

If for example, the aim is to achieve fine pores in a range of 1 μm, the pore forming materials should not be considerably above or below 1 μm. Thereby, it is ensured that the desired pore sizes are achieved in spite of the shrinkage process during sintering of the mixture into the thin porous layer. It must be presumed that shrinkage will take place. The use of pore forming materials as fillers is especially recommended when the invented thin porous layers must have low thickness and an extremely high flow. According to the invention, it is also possible to use mixtures, particularly the above-mentioned substances, also with varying thickness and/or sizes as pore forming materials. The invention also provides for combinations of pore forming materials in the mixture, in which these serve as retainers as well as fillers.

The sinterable powder contained in the mixture is made of ball-shaped and/or spattered particles. The ball-shaped particles ensure a uniform distribution of the sinterable powder and if necessary of substances, particularly pore forming materials in the mixture. Thus, the sinterable powder particles do not stick together. Spattered sinterable powders on the other hand, make feasible layers with lower thickness and relatively larger pores for the same high strength since they form more and therefore better bonds with the neighboring spattered particles than ball-shaped particles. The sinterable powder is at least partially made up of short fibers. Here, metallic fibers can be taken into account having diameters between 0.1 and 250 μm, preferably 1 μm to 50 μm, and a length of lesser μm up to millimeter size, preferably in a range of 0.1 to 500 μm.

Thus, very thin sintered open-porous layers with defined porosity can be manufactured by mixing sinterable particles in the fiber structure with sinterable particles in the ball structure in combination with the suspended pore forming materials depending on the purpose of application. Thus the permeability of the layer is increased.

In another type, the invented layer shows a graded design. This means that smaller pores exist in a separate thin porous layer on one side than the opposite side of the porous layer. With the graded design, the flow resistance of the thin-pored layer can be adapted exactly to the requirements. In order to retain the penetrating particles on the side of the invented layer with smaller pore diameter and to enable the flowing gas or fluid to pass easily on the opposite side of the layer in the area of the larger pore diameter, such type of graded layers have a lesser flow resistance as compared to non-graded layers. A graded design is preferred in case of a single layer. This reduces the production times and costs. Moreover, separation and binding problems such as leakage are eliminated, for example with aging.

Further, the invention also concerns a procedure for the manufacture of a thin porous layer with open porosity, whereby the sinterable powder with the predetermined size distribution of powder particles is suspended along with particles of predetermined size as pore forming material in a carrier fluid. At least one such layer is applied on the carrier body, dried and the green layer thus formed sintered.

While sintering a green layer formed out of sinterable powder, preferably a metallic powder, the individual powder particles bind firmly with one another whereby free spaces remain between the powder particles. These free spaces give an open porosity with respect to the thickness of the sintered layer such that the layer becomes permeable for flowing media.

After the sintering process, the layer can either be removed from the carrier or further processed along with it. Filter cartridges can be manufactured in a simple way in a single procedural step, i.e. manufacturing the sintered layer without carrier body without prior separation and then applying it on a filter cartridge. This is possible because the firm bonding achieved between the carrier body and the layer after the sintering step as long as the carrier body is able to bind with the sinterable powder, whereby the bond can be further improved by about 3 to 8 times by using highly sinter-active metallic components.

There exists a dependency between the particle size and the target pore size of the finished sintered layer. The mechanical strength of a porous sintered layer also depends on the particle size. Finer the powder particle, higher is the mechanical strength. Since the resistance to flow also depends on the thickness of the finished sintered layer depending on the medium (fluid or gaseous), porous layers with larger pore sizes have a lower mechanical strength than a porous layer with same thickness with smaller pore size. Thus, the mechanical strength of layers with larger pore size can be increased merely by increasing the layer thickness and thereby the resistance to flow.

This problem can be solved only with the help of the invented procedure by suspending the sinterable powder along with particles with predetermined size or size distribution as pore forming material in the carrier fluid.

This carrier fluid is then applied in at least one layer on the carrier body, dried and sintered. In another procedural step, the sintered layer can be removed from the carrier body or the carrier body bound firmly with the sintered layer, for example by the sintering process itself. By adding the pore forming material, it is possible to achieve a defined pore size. The sinterable powder particles distributed in the suspension and thereby in the applied thin layer and the pore forming material combine to form a lattice structure. Thus, a definite pore structure can be defined on the basis of the size or size distribution of the pore forming material, practically independent of the size and size distribution of the sinterable powder. This also means that the size and size distribution of the sinterable powder can be chosen exclusively keeping in view the mechanical strength, i.e. very fine sinter powder can be used. On the other hand, the pore forming material can be chosen keeping in the view the required porosity.

Since the sinterable powder, preferably metallic powder and the pore forming materials are suspended in a carrier fluid, particles of materials with thickness lower than that of the sinterable powder can be uniformly distributed and suspended for the pore forming material, irrespective of the varying thickness of materials and in keeping with the consistency of the suspension. Thus, it is possible to form a layer on a carrier body, in which the particles that exist as pore forming materials are uniformly distributed.

If the pore forming materials serve as retainers, these must evaporate under the effect of heat, i.e. during the sintering process preferably without any residue and remain inert as against the material of the sinterable powder even at sintering temperatures. As a result, no chemical reactions take place between the pore forming material and the sinterable material, which is, as a rule, a metal.

Evaporable solvents like ethanol, methanol, Toulon, trichlorethylene, diethyl ether and also lower molecular aldehydes and ketones can be used as carrier fluid especially at temperatures below 100° C. Paraffin, shellac as well as polymer compounds can be used as binding agents, whereby preferably polyalkylene oxide or polyglycols, especially polyethylene glycols can be used. Polyalkylene oxide and polyglycols are used preferably as polymers and/or copolymers with average molecular weights in a range of 100 to 500,000 g/moles, preferably 1,000 to 350,000 g/moles, and more preferably 5,000 to 6,500 g/moles.

In another design of the invented procedure, the portion of the pore forming materials in the suspension more or less matches with the defined pore volume of the porous layer to be produced. Thus it is possible, for example, to specify a defined porosity of the porous layer to be produced for a very fine and thereby highly sinter-active sinterable powder by specifying the volumetric details when the size of the particles of the pore forming material is given.

The consistency of the suspension adjusted on the basis of the carrier fluid mainly depends on the application of the suspension on the carrier body. The suspension can be adjusted to a thick-fluid consistency while pouring, if necessary with subsequent coating of the excess of the poured suspension layer. A thin fluid consistency must be provided for the so-called film pouring or spraying. The carrier fluid can be formed with a binding agent liquefied with an evaporable solvent. Hereby, it is ensured that the green layer has sufficient strength resulting from the bonding of individual powder particles one below the other with the binding agent.

In another form of the invention, a suspension is used for achieving a graded layer design. This suspension comprises of pore forming materials of different densities and/or size suspended in solvent. Here, there arises a balance within the layer while adding the suspension to the carrier body. As a result, the lighter particles of the pore forming materials collect in the upper area of the layer, whereas the heavier particles of the pore forming material collect closer to the side facing the carrier body of the layer. Obviously, this balance is influenced by the grain size of the used sinterable powder. If particles from a material with different sizes are used in the suspension as pore forming material then, for example, the finished sintered layer shows a gradient with respect to the pore diameter of the same. This is particularly advantageous since the flow resistance can thus be further reduced.

In a specific form of the invention, the suspension is applied in many thin partial layers one after the other on the carrier body. Hereby, the individual partial layers can be made up of an identical suspension. It is possible to use suspensions with different size distributions for the individual partial layers for the powder used and/or different particle geometries and/or different powders. This allows for example, the use of powders that give an especially good porosity to the fully sintered layer on one hand and to manufacture at least one layer that shows especially favorable, for e.g. catalytic properties in its composition for the purpose of application.

It is necessary to dry the coated partial layer before coating the next partial layer. Hereby, it is ensured that the first coated partial layer is properly fixed so that it is not deformed by the coating procedure, e.g. spraying of the next partial layer.

On the other hand, the remaining portion of the solvent in the previously coated, dried partial layer ensures that even the next partial layer is properly bound with same packing density and the finished green layer has the desired strength.

In another form of the invention, the partial layer is sintered before applying the next partial layer. This procedure is especially advantageous when powder made from different sintered materials, for example having deviating sintering temperatures, is used for a multiple-layer design. Thus, it is possible to first apply the partial layer containing the powder with the maximum sintering temperature on the carrier body, and after sintering of the first layer in the corresponding sequence to apply the subsequent partial layers with lower sintering temperatures and subject them to the sintering process. This has the advantage that the desired porosity of the individual partial layers remains intact because of the individual sintering steps. This porosity would have been lost if the suspension was coated with such a heterogeneous powder mixture in one layer and sintered in just one step. In this process, the remaining low sintered powder parts would have densely sintered because of the high sintering temperatures required for only one portion in the powder mixture. As a result, the porosity would be further lost.

If the carrier body is also part of the finished part and if, correspondingly the porous layer is fixed firmly with it, another form provides for the suspension to be applied on at least one of the walls of the carrier body made from sinterable material, dried and the green layer subsequently sintered firmly on to the carrier body.

The carrier body can be a sintered molded part or even a porous sintered molded part with a coarse pore structure. The suspension can be applied once again through thin layer required, spraying or immersion on the upper surface of the carrier body. The layer can be coated on the outer wall and/or on the inner wall depending on the purpose of application.

If the carrier body is formed by a pipe-shaped carrier body, the invented procedure provides for the rotation of the carrier body around the axis of the pipe during the application of the suspension and at least during part of the drying period. This ensures that the thickness of the layer remains intact till the fixing of the suspension as a green layer on the carrier body. Therefore, it is necessary that the suspension outlet be moved in a defined way against the surface in addition to rotation, particularly during thin layer pouring and spraying.

Porous layers applied as films or membrane or on a porous carrier body are particularly suitable as filter material and also as micro filters, provided that they have the required porosity. In case of impermeable carrier bodies, such a component can be used as a catalyst or membrane reactor, provided that it has the required powder composition and porosity, for example mixed with palladium or coated. It is further possible to use the layer as friction material, e.g. on iron base. It can be applied on a friction surface of a synchronous body for gears.

The invented porous layer can also be used in filter pipes and filter cartridges having a length of 10 mm to 1,500 mm. It is also possible to manufacture filter cartridges that exhibit a porous coating on the front side. Further, filter cartridges can be manufactured with a sintered flange that does not have any welded joints.

With the help of the invented procedure, it is possible to improve the permeability of filters while reducing the filter-active layer depending on the porosity. By reducing the thickness of the filter-active layer, the pressure loss can be distinctly reduced for constant permeability.

According to this invention, thin porous layers enable flow rates for gaseous medium such as air ranging from 1 to 1500 m$^3$/hm$^2$ at a differential pressure of e.g. 100 mbar. For fluids such as water, the flow rates at a differential pressure of, e.g. 100 mbar are 0.1- to 30-m$^3$/hm$^2$. The permeability coefficient is about $0.002 \times 10^{-12}$ to $3 \times 10^{-12}$ m$^2$ for a layer thickness of 50 to 500 µm, measured according to DIN ISO 4022.

A thin porous layer was manufactured having a thickness of 15 µm. The carrier fluid was manufactured from isopropyl alcohol, in which 1 weight %—with respect to the quantity of powder used—of polyethylene glycol having an average molecular weight of 6,000 g/moles was dissolved. Inconel metallic powder was used as powder, which had an average diameter of about 1 µm. Urea was used as pore forming material, which had an average diameter of about 2 µm. The above components were mixed for 3 hours in a mixer and finally sprayed on a plastic film. The ratio of powder to pore forming material was about 1:1, similar to that of powder to carrier fluid. The mixture was dried at room temperature for 24 hours and then sucked from the plastic film and sintered at a temperature of up to 950° C. in a sintering oven for 10 hours.

The thin open-porous film so obtained had a tensile strength of 284 N/mm$^2$. The pore structure was uniform, whereby the pores had an average diameter of about 2 µm and the porosity was about 50%.

What is claimed is:

1. A method for manufacturing a thin porous layer with open porosity comprising:
    applying a suspension of sinterable powder and a pore forming material in a carrier fluid in at least one layer on a carrier body;
    drying said at least one layer; and
    sintering said at least one layer to produce a sintered layer; wherein:
    said sinterable powder and said pore forming material, each independently, have a predeterminable particle size distribution; and
    the sintered layer having a thickness corresponding to at least about three times the average diameter of the sinterable powder; a defined pore diameter between about 0.01 µm and about 50 µm and a tensile strength between about 5 and about 500 N/mm$^2$.

2. The method of claim 1, wherein the sinterable powder comprises metallic fibers.

3. The method of claim 2, wherein the metallic fibers are 0.1 to 250 µm in diameter.

4. The method of claim 2, wherein the metallic fibers are 1 to 50 µm in diameter.

5. The method of claim 2, wherein the metallic fibers have a length up to 500 µm.

6. The method of claim 1, wherein the proportion of the pore forming material in the suspension approximately corresponds to the predetermined pore volume of the resulting sintered metal layer.

7. The method of claim 1, wherein the carrier fluid comprises a binding agent liquefied in a solvent.

8. The method of claim 1 wherein pore forming materials of different densities and/or sizes are suspended in the solvent to obtain a sintered metal layer with a graded layer structure.

9. The method of claim 1 wherein the suspension is applied in many partial layers one after another on the carrier body.

10. The method of claim 9 wherein each partial layer is at least partially dried before the application of the next partial layer.

11. The method of claim 9 wherein each partial layer is sintered before application of the next partial layer.

12. The method of claim 1 wherein the suspension is applied to the carrier body by the process of thin layer pouring, spraying or immersing.

13. The method of claim 1 wherein the suspension is applied on at least one of the walls of a porous pipe-shaped carrier body made from sinterable material and dried, and the green layer thus formed is subsequently sintered on the carrier body.

14. The method of claim 13 wherein the pipe-shaped carrier body rotates around the axis of the pipe during application of the suspension and during at least some part of the drying period.

15. A method for manufacturing a thin porous layer with open porosity comprising:
    applying a suspension of sinterable powder and a pore forming material in a carrier fluid in at least one layer on a carrier body; said sinterable powder comprising metallic fibers;
    drying said at least one layer; and
    sintering said at least one layer to produce a sintered layer; wherein:
    said sinterable powder and said pore forming material, each independently, have a predeterminable particle size distribution; and
    the sintered layer having a thickness corresponding to at least about three times the average diameter of the sinterable powder; a defined pore diameter between about 0.01 µm and about 50 µm and a tensile strength between about 5 and about 500 N/mm$^2$.

* * * * *